United States Patent

[11] 3,634,747

[72] Inventor Wallace D. Loftus
 Clairton, Pa.
[21] Appl. No. 867,526
[22] Filed Oct. 20, 1969
[45] Patented Jan. 11, 1972
[73] Assignee Westinghouse Electric Corporation
 Pittsburgh, Pa.

[54] ELECTRONIC CURRENT TO VOLTAGE CONVERTER
 6 Claims, 1 Drawing Fig.

[52] U.S. Cl. .................................................. 321/16,
 307/260, 324/131, 250/83.3 UV
[51] Int. Cl. .................................................. H02m 1/08
[50] Field of Search ................................... 307/260,
 261, 270; 321/16; 324/120, 123, 131; 330/69;
 250/83.3 UV

[56] References Cited
 UNITED STATES PATENTS

| | | | |
|---|---|---|---|
| 3,477,034 | 11/1969 | Gioia et al. | 330/69 |
| 3,509,460 | 4/1970 | Mizrahi | 330/69 |
| 3,129,332 | 4/1964 | Leen | 250/83.3 UV |
| 3,491,234 | 1/1970 | Wiltrout | 250/83.3 UV X |
| 3,493,753 | 2/1970 | Stowe | 250/83.3 UV |
| 3,504,267 | 3/1970 | James et al. | 321/8 |
| 3,515,975 | 6/1970 | South et al. | 324/120 X |

Primary Examiner—William M. Shoop, Jr.
Attorneys—F. H. Henson, C. F. Renz and M. P. Lynch

ABSTRACT: The invention is an electronic current to voltage converter circuit including a temperature compensating circuit, a differential amplifier circuit, a feedback circuit, and an input voltage zero adjust circuit for establishing and maintaining the input voltage signal to the circuit substantially zero to permit virtual short circuit current measurements of signals developed by a current generating device.

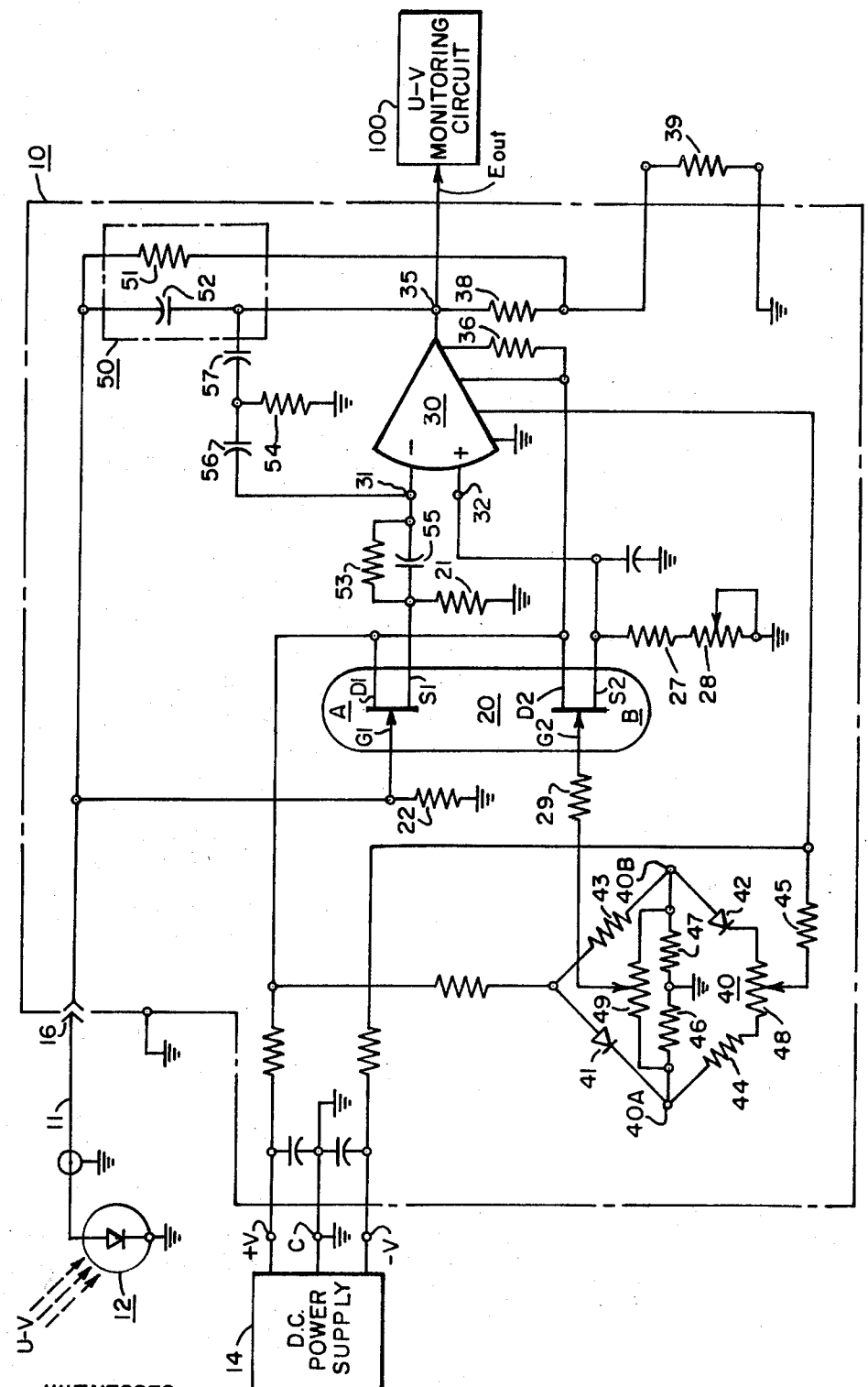

ELECTRONIC CURRENT TO VOLTAGE CONVERTER

BACKGROUND OF THE INVENTION

The accurate measurement of low-level signals generally requires complex and expensive circuits. Basic electrical signal measurement are generally in terms of voltage and current. The current-measuring circuit represents advantages over voltage-measuring circuits in that it is less susceptible to the adverse influence of cable capacitance as well as requiring less complex circuitry.

To date however the current-measuring circuits can generally be classified as laboratory instruments and as such are not suitable for on-line application in areas of adverse environmental conditions.

SUMMARY OF THE INVENTION

The invention is a current to voltage converter employing a differential operational amplifier which responds to inputs representing a current input signal from a remote current-generating device and a circuit-compensating signal to develop an output voltage signal proportional to the current input signal while utilizing a feedback circuit to maintain the input voltage measured across the current generating device at substantially zero volts.

DESCRIPTION OF THE DRAWING

The drawing is a schematic illustration of an embodiment of the invention.

DESCRIPTION OF THE PREFERRED EMBODIMENT

Referring to the drawing there is illustrated schematically an electronic current to voltage circuit 10 including amplifiers 20 and 30 and feedback circuit 50 which responds to a current signal developed in cable 11 at the input 16 of the converter circuit 10 by a transducer device 12 to generate an output voltage signal Eout which is proportional to the current signal developed by the transducer device 12. The output voltage signal Eout is applied to a monitoring circuit 100 for indication or control purposes.

A DC power supply 14 provides bias potentials to the amplifiers 20 and 30 as well as providing potential to a diode-resistor temperature compensating bridge circuit 40.

Amplifier 20 is illustrated as comprising a dual field effect transistor amplifier comprising sections A and B. Each section includes a gate electrode, a drain electrode and a source electrode. Each section of the dual field effect transistor amplifier 20 is connected as a source follower amplifier wherein the input signals to sections A and B are injected at the gate electrodes G1 and G2 respectively, and the outputs of sections A and B are taken from the source electrodes S1 and S2 respectively. Positive bias potential +V is applied to the drain electrode D1 and D2 of sections A and B respectively.

Amplifier 30 is an operational differential amplifier having an inverting input 31 and a noninverting input 32. A voltage signal developed across resistor 21 corresponding to the transducer device 12 current signal applied to the gate electrode G1 of section A is applied as an input signal to the inverting input 31 of the operational differential amplifier 30. A very small fraction of the input current signal flows through the resistor R22 and develops a voltage signal at the gate electrode G1. A converter circuit temperature compensation voltage signal corresponding to a current signal applied at the gate electrode G2 of section B by a temperature compensating bridge circuit 40 is developed across resistor 27 and rheostat 28 and applied as an input signal to the noninverting input 32 of the operational differential amplifier 30. The operational differential amplifier 30 continuously subtracts the current temperature compensating signal applied to input 32 such that the output voltage signal, Eout, of the amplifier 30 is an accurate representation of the current signal developed by the transducer device 12.

The transducer device 12 is represented as an ultraviolet detector which is capable of manifesting the change of incident ultraviolet flux as a change in resistance, voltage or current. To accurately monitor the change in incident ultraviolet flux as a current measurement it is essential to maintain a virtual zero voltage between the cable 11 and the electrical ground to thereby provide short circuit current measurements at the input 16 of the electronic current to voltage converter 10. Short circuit current measurements eliminate erroneous signals caused by cable capacitances and changes in transducer 12 resistance characteristics. In the event the transducer device 12, and in this case the ultraviolet detector, exhibits significant changes in resistance due to the changes in temperature, the presence of a voltage across the input 16 to the circuit 10 would result in erroneous output signals. The feedback circuit 50, in response to a circuit zero adjust voltage level established by a rheostat 28 during circuit calibration, establishes essentially zero voltage between the cable 11 and the electrical ground at the inputs 16 of the converter circuit 10. The zero voltage condition at the input 16 is maintained during the operation of the converter circuit 10 by the combined effect of the amplifiers 20 and 30 as will be explained in the following discussion of the operation of the converter circuit 10.

The use of section B of the field effect transistor amplifier 20 as the sole means for circuit temperature compensation would provide nominal compensation in that its effect would be limited to the amplifier 20. It would not compensate for temperature drift in the other circuit components. This compensation would be sufficient in applications which could tolerate the effects of measurable temperature drifts in the output signal.

In many applications it is essential to minimize the effect of total circuit temperature drifts. In the converter circuit 10 this is accomplished by combining the temperature compensating effects of the diode-resistor temperature bridge compensating circuit 40 and section B of the dual field effect transistor amplifier 20. The temperature compensating bridge circuit 40 consists of diodes 41 and 42, resistors 43, 44, 45, 46 and 47 and potentiometers 48 and 49.

At ambient temperature conditions, which represents minimum operating temperature conditions, prior to circuit 10 operation, a bridge balance condition is established by adjusting potentiometer 48 to establish zero voltage between points 40A and 40B of the bridge circuit 40. At ambient balance conditions there is no voltage across the potentiometer 49 thus there is no input signal to the gate G2 of section B of the dual field effect transistor amplifier 20. The bridge circuit 40 develops an increase in voltage across the potentiometer 49 as the circuit 10 temperature increases. During calibration the circuit 10 is subjected to the anticipated highest operating temperature which results in a voltage signal at the output 35 of the amplifier 30 which represents the circuit temperature drift. The potentiometer 49 is then adjusted to return the voltage at the output 35 of the amplifier 30 to the low-temperature value. The bridge circuit is thus calibrated to compensate for converter circuit 10 temperature drift under normal converter circuit operating conditions.

After the converter circuit 10 temperature compensation has been established, the rheostat 28 is adjusted to establish a zero voltage condition at the input 16 of the converter circuit 10 and in so doing shifts slightly the operating point of the circuit. The adjustment of rheostat 28 adjusts the voltage signal applied to the input 32 of the operational differential amplifier 30 to compensate for inherent circuit component tolerances which results in the development of voltage levels unrelated to converter input signals. The inherent circuit unbalance resulting from these voltage levels is compensated for by adjusting rheostat 28 to achieve zero voltage at input 16 prior to circuit 10 operation. In achieving the desired zero voltage at input 16 a small voltage signal or offset is developed at the output 35 of the operational differential amplifier 30. This small voltage offset, typically a few millivolts, remains constant and in most applications can be ignored. However, if necessary, additional electronics can be provided to subtract this affect.

The adjustment of rheostat 28 forces a zero voltage condition at the input 16 of the converter circuit 10. This procedure differs from the conventional amplifier circuits in which the output is adjusted to zero volts for zero input signal in that the input 16 of the converter circuit and thus the input of the amplifier 30 is adjusted and maintained at zero volts. For this reason the adjustable potentiometer generally required by conventional amplifiers to establish zero output conditions at zero input conditions is replaced by a fixed resistor 36.

During converter circuit 10 operation in response to a current input signal at the input 16, the zero voltage condition established at input 16 by rheostat 28 is maintained by the amplifiers 20 and 30 through the closed loop feedback circuit provided by the feedback impedance 50. An insignificant fraction of the input current signal flows through resistor 22 and develops an amplifier 20 output voltage which is applied to the noninverting input 31 of the amplifier 30. Due to the polarity reversal provided by the operation of differential amplifier 30, the application of a positive voltage signal at the inverting input 31 will result in a negative $E_{out}$ voltage. This negative polarity condition forces the current to flow through the feedback resistor 51 thus eliminating the development of an input voltage condition across resistor 22 which would occur if a significant current were permitted to flow through resistor 22 to ground. The resistance of the feedback resistor 51 is orders of magnitude greater than the resistance of the resistor 22. The output voltage $E_{out}$ of the converter circuit 10 is a measure of the current in the feedback resistor 51 and thus of the input signal to the converter circuit 10. Resistors 38 and 39 represents scaling resistors connected in a divider network. It is apparent that the resistor 51 could be connected directly to the output 35 of the amplifier 30 thus eliminating resistors 38 and 39.

Feedback circuit 50 represented by resistor 51 and capacitor 52 provides converter circuit response times of approximately 1 second. While this response time is acceptable for many control and indication applications, response times in the order of 1 millisecond can be achieved by incorporating a second inner loop feedback circuit consisting of resistors 53 and 54, and capacitors 55, 56 and 57. Numerous resistor-capacitor networks could be utilized in the inner and outer feedback loops to provide required again factors, required dynamic responses and required gain roll off characteristics.

While the amplifiers 20 and 30 are illustrated as comprising a dual field effect transistor and an operational amplifier respectively, several other combinations can be employed to achieve the same operational characteristics. These characteristics include high-input resistance, suitable signal amplification, and temperature compensation. Section A of the dual field effect transistor amplifier 20 provides the desired high-input resistance while section B provides temperature compensation. It is apparent therefore that the dual field effect transistor of amplifier 20 can be replaced by a set of matched separate field effect transistors.

Yet another alternative would be the use of a field effect input operational amplifier which incorporates the high-input resistance characteristics of the field effect transistor and the gain characteristics of an operational amplifier in a single amplifier. In this latter arrangement a single field effect transistor could be employed for temperature compensating purposes.

I claim:

1. An electronic converter circuit for converting a current signal developed by a current generating means into a corresponding output voltage signal, comprising, a differential amplifier circuit means having a first and second input and an output, said current generating means operatively connected to said first input, a temperature compensating circuit means operatively connected to said second input and applying a temperature compensating signal thereto, said differential amplifier circuit means developing a voltage signal at said output representing the difference between the signals applied to said first and second input, said voltage signal being proportional to the current signal developed by said current generating means, a feedback circuit means operatively connected between the output of said differential amplifier circuit means and said first input of said differential amplifier circuit means, and a zero adjust circuit means operatively connected to said differential amplifier circuit means to establish a substantially zero voltage input condition at the first input of said differential amplifier circuit means, said differential amplifier circuit means maintaining the substantially zero voltage input condition at said first input of said differential amplifier circuit means through said feedback circuit means to provide virtual short circuit current measurements of the current signal developed by said current-generating means, wherein said temperature compensating circuit means includes a field effect transistor circuit.

2. An electronic converter circuit as claimed in claim 1 wherein said first input of said differential amplifier circuit means is an inverting input and said second input is a noninverting input, said zero adjust circuit means being operatively connected to said second input.

3. An electronic converter circuit for converting a current signal developed by a current generating means into a corresponding output voltage signal, comprising, a differential amplifier circuit means having a first and second input and an output, said current-generating means operatively connected to said first input, a temperature compensating circuit means operatively connected to said second input and applying a temperature compensating signal thereto, said differential amplifier circuit means developing a voltage signal at said output representing the difference between the signals applied to said first and second input, said voltage signal being proportional to the current signal developed by said current-generating means, a feedback circuit means operatively connected between the output of said differential amplifier circuit means and said first input of said differential amplifier circuit means, and a zero adjust circuit means operatively connected to said differential amplifier circuit means to establish a substantially zero voltage input condition at the first input of said differential amplifier circuit means, said differential amplifier circuit means maintaining the substantially zero voltage input condition at said first input of said differential amplifier circuit means through said feedback circuit means to provide virtual short circuit current measurements of the current signal developed by said current-generating means, wherein said temperature compensating circuit means comprises an operative combination of a diode-resistor temperature compensating bridge circuit and a field effect transistor circuit.

4. An electronic converter circuit for converting a current signal developed by a current-generating means into a corresponding output voltage signal, comprising, a differential amplifier circuit means having a first and second input and an output, said current-generating means operatively connected to said first input, a temperature compensating circuit means operatively connected to said second input and applying a temperature compensating signal thereto, said differential amplifier circuit means developing a voltage signal at said output representing the difference between the signals applied to said first and second input, said voltage signal being proportional to the current signal developed by said current-generating means, a feedback circuit means operatively connected between the output of said differential amplifier circuit means and said first input of said differential amplifier circuit means, and a zero adjust circuit means operatively connected to said differential amplifier circuit means to establish a substantially zero voltage input condition at the first input of said differential amplifier circuit means, said differential amplifier circuit means maintaining the substantially zero voltage input condition at said first input of said differential amplifier circuit means through said feedback circuit means to provide virtual short circuit current measurements of the current signal developed by said current generating means, further including a field effect transistor amplifier having an input and an output and operatively coupling the output of said current-generating means to the first input of said differential amplifier circuit means, said field effect transistor amplifier establishing a high resistance input, said feedback circuit means operatively coupled between the output of said differential amplifier circuit means and the input of said field effect transistor amplifier.

5. An electronic converter circuit as claimed in claim 4 including a second feedback circuit means operatively coupled between the output of said differential amplifier circuit means and the first input of said differential amplifier circuit means, said second feedback circuit means providing dynamic response of the electronic converter circuit to said input current signal.

6. An electronic converter circuit as claimed in claim 1 wherein said differential amplifier circuit means comprises a field effect input differential operational amplifier.

* * * * *